United States Patent
Catovic et al.

(10) Patent No.: US 9,591,593 B2
(45) Date of Patent: Mar. 7, 2017

(54) SYSTEMS, METHODS AND APPARATUS FOR RADIO UPLINK POWER CONTROL

(75) Inventors: Amer Catovic, Carlsbad, CA (US); Mohamed A. El-saidny, Dubai (AE)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 13/539,203

(22) Filed: Jun. 29, 2012

(65) Prior Publication Data

US 2013/0021915 A1    Jan. 24, 2013

Related U.S. Application Data

(60) Provisional application No. 61/510,834, filed on Jul. 22, 2011.

(51) Int. Cl.
*H04W 52/30*   (2009.01)
*H04W 52/28*   (2009.01)
(Continued)

(52) U.S. Cl.
CPC ....... *H04W 52/286* (2013.01); *H04W 52/288* (2013.01); *H04W 52/346* (2013.01); *H04W 52/44* (2013.01); *H04W 52/146* (2013.01)

(58) Field of Classification Search
CPC .. H04L 1/0025; H04W 52/146; H04W 52/24; H04W 52/228; H04W 52/34; H04W 52/26; H04W 52/365; H04W 52/04
(Continued)

(56) References Cited

U.S. PATENT DOCUMENTS 6,970,437 B2   11/2005   Lott et al.
7,035,240 B1   4/2006   Balakrishnan et al.
(Continued)

FOREIGN PATENT DOCUMENTS

EP   1263160 A1   12/2002
EP   1372310 A1   12/2003
(Continued)

OTHER PUBLICATIONS

3GPP TS 25.321 V10.3.0 (Jun. 2011), 3rd Generation Partnership Project; Technical Specification Group Radio Access Network; Medium Access Control (MAC) protocol specification (Release 10), 198 pages.
(Continued)

*Primary Examiner* — Andrew Chriss
*Assistant Examiner* — Romani Ohri
(74) *Attorney, Agent, or Firm* — Darren M. Simon

(57) ABSTRACT

In some implementations of the present invention, improvement of connection quality and reduction of dropped connection rate are achieved by suspending the transmission of High Speed Dedicated Physical Control Channel (HS-DPCCH) data when a wireless terminal detects a power limiting mode during multi-radio access bearer (MRAB) connections and voice RAB is present, and correspondingly increasing uplink transmission power to voice and signaling data channels. In some implementations, the suspension of HS-DPCCH data can be complete or partial. When fully suspended, no data is sent on the HS-DPCCH. When partially suspended, no channel quality indicator (CQI) is transmitted. In both partial and full suspension schemes, the CQI transmission is suspended until the terminal detects that entry conditions to this state has been terminated.

33 Claims, 6 Drawing Sheets

(51) Int. Cl.
*H04W 52/34* (2009.01)
*H04W 52/44* (2009.01)
*H04W 52/14* (2009.01)

(58) Field of Classification Search
USPC .............................. 370/230, 329, 336–337
See application file for complete search history.

(56) References Cited

U.S. PATENT DOCUMENTS

| | | | |
|---|---|---|---|
| 7,120,134 B2 | 10/2006 | Tiedemann et al. | |
| 7,289,473 B1 | 10/2007 | Padovani et al. | |
| 7,379,478 B1 | 5/2008 | Mantha | |
| 7,751,320 B2 | 7/2010 | Nuzman et al. | |
| 7,962,148 B2 | 6/2011 | Stamoulis et al. | |
| 8,041,375 B2 | 10/2011 | Laroia et al. | |
| 8,620,337 B2 | 12/2013 | Meredith et al. | |
| 8,634,384 B2 | 1/2014 | Marsh | |
| 8,755,745 B2 | 6/2014 | Gandolfo | |
| 2003/0021262 A1 | 1/2003 | Ma et al. | |
| 2005/0180449 A1 | 8/2005 | Ranta-Aho et al. | |
| 2006/0154603 A1 | 7/2006 | Sachs et al. | |
| 2006/0195727 A1 | 8/2006 | Yoshitsugu et al. | |
| 2006/0291395 A1 | 12/2006 | Ketonen et al. | |
| 2007/0183520 A1* | 8/2007 | Kim .................... H04L 1/0001 | 375/260 |
| 2008/0008136 A1 | 1/2008 | Padovani et al. | |
| 2008/0043619 A1 | 2/2008 | Sammour et al. | |
| 2008/0130584 A1* | 6/2008 | Pani et al. .................. 370/332 | |
| 2008/0132268 A1 | 6/2008 | Choi-Grogan et al. | |
| 2008/0144598 A1 | 6/2008 | Jiang | |
| 2008/0186944 A1 | 8/2008 | Suzuki et al. | |
| 2008/0194282 A1 | 8/2008 | Nibe et al. | |
| 2008/0209297 A1* | 8/2008 | Chandra et al. ............. 714/748 | |
| 2008/0226074 A1 | 9/2008 | Sammour et al. | |
| 2008/0293426 A1* | 11/2008 | Kim et al. ................... 455/450 | |
| 2008/0310338 A1 | 12/2008 | Charpenter et al. | |
| 2009/0044067 A1 | 2/2009 | Obuchi et al. | |
| 2009/0093255 A1 | 4/2009 | Balasubramanian | |
| 2009/0104901 A1 | 4/2009 | Baker et al. | |
| 2009/0135773 A1 | 5/2009 | Aghili et al. | |
| 2009/0157852 A1 | 6/2009 | Krupkin et al. | |
| 2009/0161545 A1 | 6/2009 | Ho et al. | |
| 2009/0175175 A1 | 7/2009 | Somasundaram et al. | |
| 2009/0286496 A1* | 11/2009 | Yavuz .................. H04W 52/241 | 455/127.1 |
| 2009/0316575 A1* | 12/2009 | Gholmieh ........... H04W 76/048 | 370/225 |
| 2010/0008302 A1 | 1/2010 | Sayers et al. | |
| 2010/0034114 A1 | 2/2010 | Kim et al. | |
| 2010/0091723 A1 | 4/2010 | Park et al. | |
| 2010/0113006 A1 | 5/2010 | Pajjuri et al. | |
| 2010/0144363 A1 | 6/2010 | De Rosa et al. | |
| 2010/0165901 A1 | 7/2010 | Kim | |
| 2010/0195519 A1 | 8/2010 | Ji | |
| 2010/0220615 A1 | 9/2010 | Enstrom et al. | |
| 2010/0260049 A1 | 10/2010 | Racz et al. | |
| 2010/0278341 A1 | 11/2010 | Kubota | |
| 2010/0303030 A1 | 12/2010 | Andersson | |
| 2010/0316040 A1 | 12/2010 | Kim et al. | |
| 2010/0323748 A1 | 12/2010 | Padovani et al. | |
| 2011/0009073 A1 | 1/2011 | Burbidge et al. | |
| 2011/0019756 A1 | 1/2011 | Chun et al. | |
| 2011/0105174 A1* | 5/2011 | Pelletier et al. ............. 455/522 | |
| 2011/0149787 A1 | 6/2011 | Digirolamo et al. | |
| 2011/0158140 A1 | 6/2011 | Asokan | |
| 2011/0158194 A1 | 6/2011 | Musikka et al. | |
| 2011/0159911 A1* | 6/2011 | Chen .................. H04W 52/221 | 455/522 |
| 2011/0179329 A1 | 7/2011 | Kim et al. | |
| 2011/0194479 A1 | 8/2011 | Jin et al. | |
| 2011/0205985 A1* | 8/2011 | Kim et al. ................... 370/329 | |
| 2011/0243080 A1 | 10/2011 | Chen et al. | |
| 2011/0249563 A1 | 10/2011 | Provvedi et al. | |
| 2011/0268088 A1 | 11/2011 | Lindskog et al. | |
| 2011/0269463 A1 | 11/2011 | Wang et al. | |
| 2011/0286387 A1 | 11/2011 | Sane et al. | |
| 2011/0317719 A1 | 12/2011 | Vedantham et al. | |
| 2012/0002541 A1 | 1/2012 | Lee et al. | |
| 2012/0009930 A1 | 1/2012 | Brisebois et al. | |
| 2012/0020286 A1 | 1/2012 | Damnjanovic et al. | |
| 2012/0026921 A1 | 2/2012 | Choi | |
| 2012/0064908 A1 | 3/2012 | Fox et al. | |
| 2012/0069750 A1 | 3/2012 | Xing et al. | |
| 2012/0082096 A1 | 4/2012 | Cave et al. | |
| 2012/0083264 A1 | 4/2012 | Ramasamy et al. | |
| 2012/0093110 A1 | 4/2012 | Somasundaram et al. | |
| 2012/0178438 A1 | 7/2012 | Vashi et al. | |
| 2012/0201134 A1* | 8/2012 | Wang Helmersson et al. .............................. 370/230 | |
| 2012/0264397 A1* | 10/2012 | Meredith et al. ............. 455/410 | |
| 2012/0269148 A1* | 10/2012 | Hultell et al. ................ 370/329 | |
| 2013/0003523 A1 | 1/2013 | Singh et al. | |
| 2013/0003542 A1 | 1/2013 | Catovic et al. | |
| 2013/0003631 A1 | 1/2013 | Catovic et al. | |
| 2013/0033990 A1 | 2/2013 | Catovic et al. | |
| 2013/0058315 A1* | 3/2013 | Feuersanger et al. ........ 370/336 | |
| 2013/0064098 A1 | 3/2013 | El-Saidny et al. | |
| 2013/0077616 A1 | 3/2013 | Arulprakasam et al. | |
| 2013/0148499 A1 | 6/2013 | Racz et al. | |
| 2014/0119333 A1* | 5/2014 | Hedlund ........... H04W 72/1205 | 370/330 |
| 2014/0133323 A9 | 5/2014 | Guarino | |
| 2015/0009950 A1 | 1/2015 | Sundberg et al. | |

FOREIGN PATENT DOCUMENTS

| | | |
|---|---|---|
| EP | 1465371 A1 | 10/2004 |
| EP | 1653758 A1 | 5/2006 |
| EP | 1768296 A2 | 3/2007 |
| EP | 1811690 A1 | 7/2007 |
| EP | 1956728 A2 | 8/2008 |
| EP | 2256996 A1 | 12/2010 |
| EP | 2317815 A1 | 5/2011 |
| JP | 2006087113 A | 3/2006 |
| JP | 2008048325 A | 2/2008 |
| JP | 2008199157 A | 8/2008 |
| JP | 2009044370 A | 2/2009 |
| JP | 2009517935 A | 4/2009 |
| JP | 2009188739 A | 8/2009 |
| JP | 2011518468 A | 6/2011 |
| JP | 2012521150 A | 9/2012 |
| JP | 2013506364 A | 2/2013 |
| KR | 20050096763 A | 10/2005 |
| WO | 0038368 A1 | 6/2000 |
| WO | 0122645 A1 | 3/2001 |
| WO | 0193513 A2 | 12/2001 |
| WO | 02065664 | 8/2002 |
| WO | 2005011212 A1 | 2/2005 |
| WO | 2005015940 A1 | 2/2005 |
| WO | 2005112500 A1 | 11/2005 |
| WO | 2006012377 A1 | 2/2006 |
| WO | 2008097544 A2 | 8/2008 |
| WO | 2009046374 | 4/2009 |
| WO | 2009058085 A2 | 5/2009 |
| WO | 2009116939 A2 | 9/2009 |
| WO | WO 2010002178 A2 * | 1/2010 |
| WO | 2010088295 A1 | 8/2010 |
| WO | 2010107360 A1 | 9/2010 |
| WO | 2011025438 A1 | 3/2011 |
| WO | 2011049495 A1 | 4/2011 |
| WO | 2011059373 A1 | 5/2011 |
| WO | 2011072735 A1 | 6/2011 |

OTHER PUBLICATIONS

3GPP TS 25.331 V10.3.1, "3rd Generation Partnership Project; Technical Specification Group Radio Access Network; Radio Resource Control (RRC); Protocol Specification (Release 10)" (Apr. 2011).
Brunner, et al., "Inter-System Handover Parameter Optimization," 2006 IEEE 64th Vehicular Technology Conference, pp. 1-6.

(56) References Cited

OTHER PUBLICATIONS

International Search Report and Written Opinion—PCT/US2012/045331—ISA/EPO—Sep. 10, 2012.
Siemens: "Contribution to Power Limit Problem in HSDPA Case", 3GPP Draft; R2-040981, 3rd Generation Partnership Project (3GPP), Mobile Competence Centre ; 650, Route Des Lucioles ; F-06921 Sophia-Antipolis Cedex ; France, vol. RAN WG2, No. Montreal, Canada; May 17, 2004, May 17, 2004 (May 17, 2004), XP050125851.
Xu, et al., "Performance Analysis on the Radio Link Control Protocol of UMTS System," Proceedings from 2002 IEEE 56th Vehicular Technology Conference, vol. 4, pp. 2026-2030.
Renesas Mobile Europe Ltd: "Cell update-less RLC/PDCP unrecoverable error recovery", 3GPP R2-113178, 3GPP, May 9, 2011, 2 Pages.
Samsung, "CQI and ACK/NACK Transmission Supporting Dual-Cell HSDPA", 3GPP TSG-RAN WG1#54b, R1-083562, Oct. 3, 2008.

\* cited by examiner

SYSTEMS, METHODS AND APPARATUS FOR RADIO UPLINK POWER CONTROL

CROSS-REFERENCE TO RELATED APPLICATIONS

The disclosure claims priority to U.S. Provisional Patent Application No. 61/510,834, filed Jul. 22, 2011, entitled "SYSTEMS, METHODS AND APPARATUS FOR RADIO UPLINK POWER CONTROL," and assigned to the assignee hereof. The disclosure of this prior application is considered part of, and is incorporated by reference in, this disclosure.

BACKGROUND

Aspects of the present invention relate to wireless communication, and in particular, to systems, method and apparatus configured to enable radio link power control.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals (e.g. cellphones, tablet computers and other electronic devices). Each wireless terminal communicates with one or more base stations via transmissions on one or more uplinks and downlinks. A downlink (or forward link) refers to the communication link from the base stations to the wireless terminal, and an uplink (or reverse link) refers to the communication link from the wireless terminal to the base station. These communication links may be established via a single-in-single-out (SISO), multiple-in-single-out (MISO), or a multiple-in-multiple-out (MIMO) system.

A MIMO system employs multiple transmit antennas and multiple receive antennas for data transmission. A MIMO channel formed by the transmit and receive antennas may be decomposed into independent channels, which are also referred to as spatial channels. Each of the independent channels corresponds to a dimension. The MIMO system can provide improved performance (e.g., higher throughput and/or greater reliability) if the additional dimensions created by the multiple transmit and receive antennas are utilized.

A MIMO system supports time division duplex (TDD) and frequency division duplex (FDD) systems. In a TDD system, the uplink and downlink transmissions are within the same frequency region so that the reciprocity principle allows the estimation of the downlink channel from the uplink channel. This enables the base station to extract transmit beamforming gain on the downlink when multiple antennas are available at the base station.

The primary purpose of the base station is to provide a connection between a wireless terminal or terminals and the core communications network. To that end, base stations handle the radio transmission and reception to and from wireless terminals.

To establish a call connection between a wireless terminal and a base station, a Radio Access Bearer (RAB) is needed. The RAB carries voice or other data between the wireless terminal and the core communication network. There are different types of RABs for different types of data, such as, for example, voice data, streaming data (e.g. streaming a video clip), interactive data (e.g. interacting with a website) and others. Simultaneous connections to the voice and data channels require multiple RABs and may be referred to as Multi-RAB or MRAB connections. In the early days of combined voice and data networks, e.g. 3G UMTS, simultaneous voice and data connections were not prevalent. However, newer wireless terminal devices (e.g. touch-screen cellular telephones) increasingly use voice and data connections simultaneously. Unfortunately, because wireless terminals usually have limited transmit power, MRAB calls may increase the rate of dropped calls or connections due to the limited transmission power being divided between too many channels simultaneously. Accordingly, there is a need to improve the allocation of transmission power during MRAB calls to improve connection quality for wireless terminals.

SUMMARY

Various implementations of systems, methods and apparatus within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations are used to manage power allocation to various channels in MRAB calls.

In one aspect, a method of wireless communication in a voice and data communication is provided. The method includes detecting, in a wireless terminal, a power limited mode based on a condition of the wireless terminal. The method further includes suspending, based on the detecting, transmission of at least a portion of information of at least one uplink channel at the wireless terminal. The transmission is suspended for a duration of the detected power limited mode.

In another aspect, an apparatus for wireless communication in a voice and data communication is provided. The apparatus includes a receiver configured to receive data from a base station. The apparatus further includes a transmitter configured to transmit data to a base station. The apparatus further includes a processor configured to detect a power limited mode based on a condition of a wireless terminal and suspend transmission of the uplink control data on a first channel. The processor is further configured to suspend, based on the detected power limited mode, transmission of at least a portion of information of at least one uplink channel at the wireless terminal. The processor is configured to suspend the transmission for a duration of the detected power limited mode.

In another aspect, another apparatus for wireless communication in a voice and data communication is provided. The apparatus includes means for detecting, in a wireless terminal, a power limited mode based on a condition of the wireless terminal. The apparatus further includes means for suspending, based on detection of the power limited mode, transmission of at least a portion of information of at least one uplink channel at the wireless terminal. The transmission is suspended for a duration of the detected power limited mode.

In another aspect, a computer program product for wirelessly communicating in a voice and data communication is provided. The computer program product includes a non-transitory computer readable medium includes instructions that when executed cause an apparatus to detect, in a wireless terminal, a power limited mode based on a condition of the wireless terminal. The medium further includes instructions that, when executed, cause the apparatus to suspend, based on the detected power limited mode, transmission of at least a portion of information of at least one uplink channel at the wireless terminal. The transmission is suspended for a duration of the detected power limited mode.

BRIEF DESCRIPTION OF THE DRAWINGS

So that the manner in which features of the present disclosure can be understood in detail, a more particular description, briefly summarized above, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects.

Figure 1:
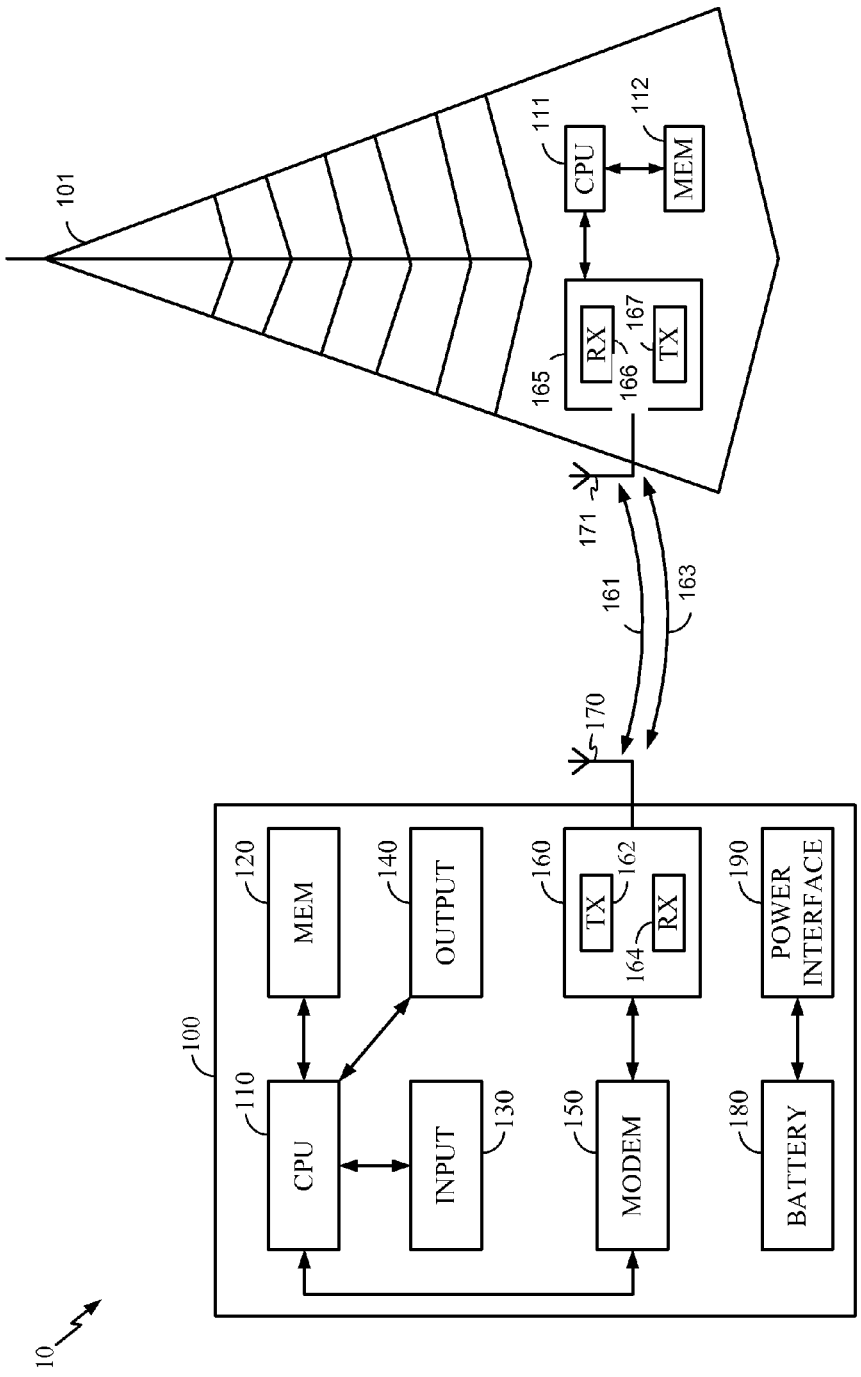
FIG. 1 is a functional block diagram of a wireless communication system.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, IEEE 802.22, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Similarly, cdma2000 is described in documents from an organization named "3rd Generation Partnership Project 2" (3GPP2). These various radio technologies and standards are known in the art.

In some aspects the teachings herein may be employed in a network that includes macro scale coverage (e.g., a large area cellular network such as a 3G network, typically referred to as a macro cell network) and smaller scale coverage (e.g., a residence-based or building-based network environment). As a wireless terminal (WT) or user equipment (UE) moves through such a network, the wireless terminal may be served in certain locations by base stations (BSs) or access nodes (ANs) that provide macro coverage while the wireless terminal may be served at other locations by access nodes that provide smaller scale coverage, e.g. femto nodes (FNs). In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, access point, base station, Node B, eNodeB, macro cell, and so on. Also, a femto node may be configured or referred to as a Home NodeB (HNB), Home eNodeB (HeNB), access point access point, femto cell, and so on.

FIG. 1 is a functional block diagram of a wireless communication system 10. The wireless communication system 10 includes at least one wireless terminal 100 and at least one base station 101 communicating with each other over a first communication link 161 and a second communication link 163. Each of the first and second communication links 161, 163 can be a single-packet communication link on which a single packet may be transmitted during each cycle or a multi-packet communication link on which on which multiple packets may be transmitted during each cycle. For example, the first communication link 161 can be a dual-packet communication link on which zero, one, or two packets can be transmitted during each cycle.

The wireless terminal 100 includes a processor 110 in data communication with a memory 120, an input device 130, and an output device 140. The processor is further in data communication with a modem 150 and a transceiver 160. The transceiver 160 is also in data communication with the modem 150 and an antenna 170. The wireless terminal 100 and components thereof are powered by a battery 180 and/or an external power source. In some embodiments, the battery 180, or a portion thereof, is rechargeable by an external power source via a power interface 190. Although described separately, it is to be appreciated that functional blocks described with respect to the wireless terminal 100 need not be separate structural elements. For example, the processor 110 and memory 120 may be embodied in a single chip. Similarly, two or more of the processor 110, modem 150, and transceiver 160 may be embodied in a single chip.

The processor 110 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 110 can be coupled, via one or more buses, to read information from or write information to the memory 120. The processor may additionally, or in the alternative, contain memory, such as processor registers. The memory 120 can include processor cache, including a multi-level hierarchical cache in which different levels have different capacities and access speeds. The memory 120 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 110 is also coupled to an input device 130 and an output device 140 for, respectively, receiving input from and providing output to, a user of the wireless terminal 100. Suitable input devices include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, and haptic output devices, including force-feedback game controllers and vibrating devices.

The processor 110 is further coupled to a modem 150 and a transceiver 160. The modem 150 and transceiver 160 prepare data generated by the processor 110 for wireless transmission over the communication links 161, 163 via the antenna 170 according to one or more air interface standards. The modem 150 and transceiver 160 also demodulate data received over the communication links 161, 163 via the antenna 170 according to one or more air interface standards. The transceiver can include a transmitter 162, a receiver 164, or both. In other embodiments, the transmitter 162 and receiver 164 are two separate components. The modem 150 and transceiver 160, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. The antenna 170 can include multiple antennas for multiple-input/multiple-output (MIMO) communication.

The wireless terminal 100 and components thereof are powered by a battery 180 and/or an external power source. The battery 180 can be any device which stores energy, and particularly any device which stores chemical energy and provides it as electrical energy. The battery 180 can include one or more secondary cells including a lithium polymer battery, a lithium ion battery, a nickel-metal hydride battery, or a nickel cadmium battery, or one or more primary cells including an alkaline battery, a lithium battery, a silver oxide battery, or a zinc carbon battery. The external power source can include a wall socket, a vehicular cigar lighter receptacle, a wireless energy transfer platform, or the sun.

In some embodiments, the battery 180, or a portion thereof, is rechargeable by an external power source via a power interface 190. The power interface 190 can include a jack for connecting a battery charger, an inductor for near field wireless energy transfer, or a photovoltaic panel for converting solar energy into electrical energy.

In some embodiments, the wireless terminal 100 is a mobile telephone, a personal data assistant (PDAs), a handheld computer, a laptop computer, a wireless data access card, a GPS receiver/navigator, a camera, an MP3 player, a camcorder, a game console, a wrist watch, a clock, or a television.

The base station 101 also includes at least a processor 111 coupled to a memory 112 and a transceiver 165. The transceiver 165 includes a transmitter 167 and a receiver 166 coupled to an antenna 171. The processor 111, memory 112, transceiver 165, and antenna 171 can be embodied as described above with respect to the wireless terminal 100.

In the wireless communication system 10 of FIG. 1, the base station 101 can transmit data packets to the wireless terminal 100 via a first communication link 161 and a second communication link 163. In one embodiment, the base station can transmit, via the first communication link 161, up to two packets per cycle, whereas the base station 101 can only transmit up to one packet per cycle via the second communication link 163.

Figure 2:
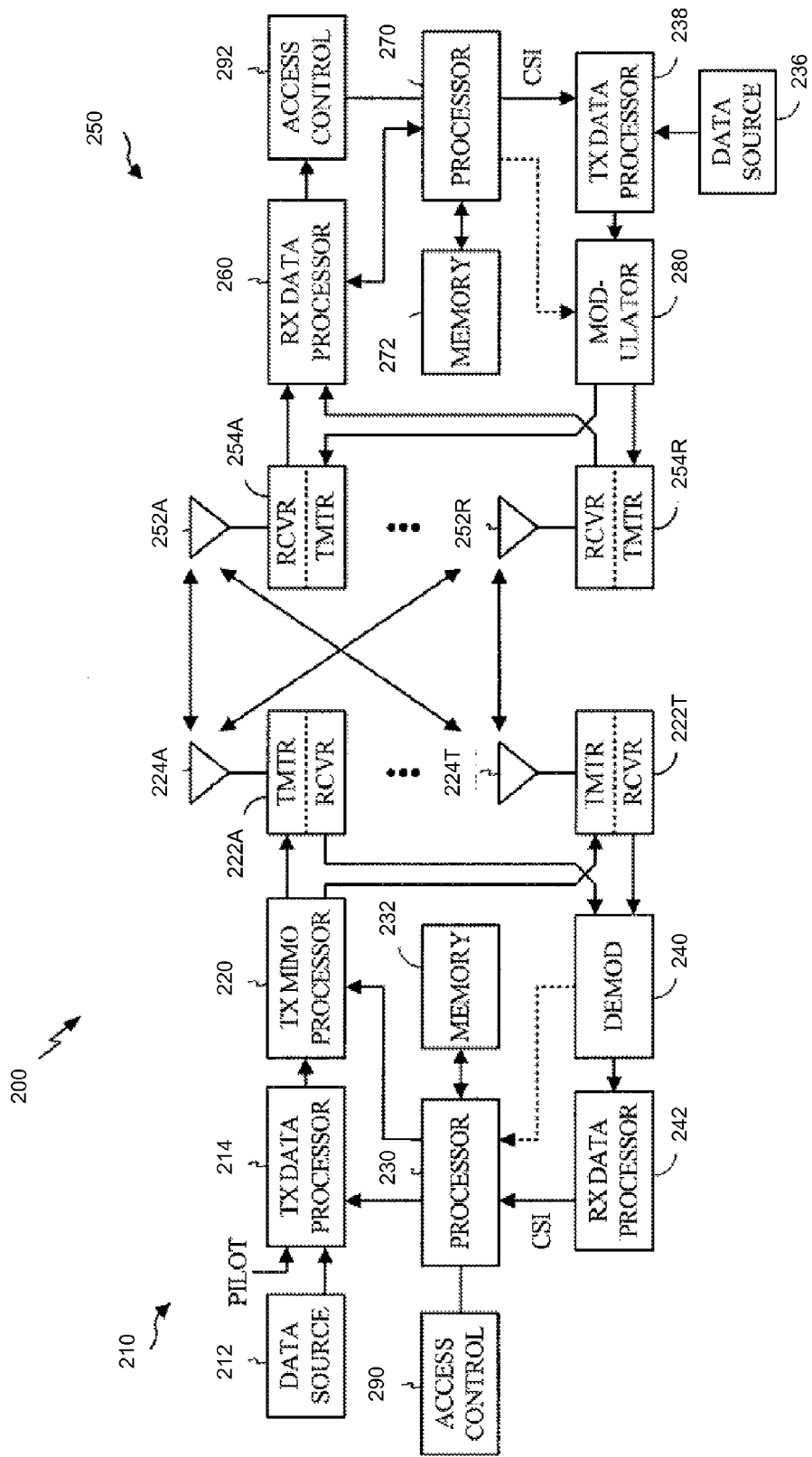
FIG. 2 is a functional block diagram of components that may be employed to facilitate communication between communication nodes, such a wireless terminal and a base station.

FIG. 2 depicts several sample components that may be employed to facilitate communication between communication nodes, such as a wireless terminal and a base station. Specifically, FIG. 2 is a simplified block diagram of a first wireless device 210 (e.g., a base station) and a second wireless device 250 (e.g., a wireless terminal) of a MIMO system 200. At the first device 210, traffic data for a number of data streams is provided from a data source 212 to a transmit (TX) data processor 214.

In some implementations, each data stream is transmitted over a respective transmit antenna. The TX data processor 214 formats, codes, and interleaves the traffic data for each data stream based on a particular coding scheme selected for that data stream.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 230. A data memory 232 may store program code, data, and other information used by the processor 230 or other components of the device 210.

The modulation symbols for all data streams are then provided to a TX MIMO processor 220, which may further process the modulation symbols (e.g., for OFDM). The TX MIMO processor 220 then provides modulation symbol streams to transceivers (XCVR) 222A through 222T. In some aspects, the TX MIMO processor 220 applies beamforming weights to the symbols of the data streams and to the antenna from which the symbol is being transmitted.

Each transceiver 222 receives and processes a respective symbol stream to provide one or more analog signals, and further conditions (e.g., amplifies, filters, and upconverts) the analog signals to provide a modulated signal suitable for transmission over the MIMO channel. Modulated signals from transceivers 222A through 222T are then transmitted from antennas 224A through 224T, respectively.

At the second device 250, the transmitted modulated signals are received by antennas 252A through 252R and the received signal from each antenna 252 is provided to a respective transceiver (XCVR) 254A through 254R. Each transceiver 254 conditions (e.g., filters, amplifies, and downconverts) a respective received signal, digitizes the conditioned signal to provide samples, and further processes the samples to provide a corresponding "received" symbol stream.

A receive (RX) data processor 165 then receives and processes the received symbol streams from transceivers 254 based on a particular receiver processing technique to provide "detected" symbol streams. The RX data processor 165 then demodulates, deinterleaves, and decodes each detected symbol stream to recover the traffic data for the data stream. The processing by the RX data processor 165 is complementary to that performed by the TX MIMO processor 220 and the TX data processor 214 at the device 210.

The processor 270 formulates an uplink message, which may comprise various types of information regarding the communication link and/or the received data stream. The reverse link message is then processed by a TX data processor 238, which also receives traffic data for a number of data streams from a data source 236, modulated by a modulator 280, conditioned by the transceivers 254A through 254R, and transmitted back to the device 210.

At the device 210, the modulated signals from the second device 250 are received by the antennas 224, conditioned by the transceivers 222, demodulated by a demodulator (DEMOD) 240, and processed by an RX data processor 242 to extract the uplink message transmitted by the second device 250. The processor 230 then processes the extracted message.

FIG. 2 also illustrates that the communication components may include one or more components that perform access control. For example, an access control component 290 may cooperate with the processor 230 and/or other components of the device 210 to send/receive signals to/from another device (e.g., device 250). Similarly, an access control component 292 may cooperate with the processor 270 and/or other components of the device 250 to send/receive signals to/from another device (e.g., device 210). It should be appreciated that for each device 210 and 250 the functionality of two or more of the described components may be provided by a single component. For example, a single processing component may provide the functionality of the access control component 290 and the processor 230 and a single processing component may provide the functionality of the access control component 292 and the processor 270.

The interface between base stations and wireless terminals may be described by a protocol stack that consists of a number of protocol layers, each giving a specific service to the next layer above and/or below. For example, a top layer of the protocol stack, sometimes referred to as the radio resource control (RRC) layer, may control signaling to control the wireless connection to the wireless terminal. This layer may additionally provide control of aspects of the wireless terminal from the base station and may include functions to control radio bearers, physical channels, mapping of different channel types, measurement and other functions.

The next layer down, sometimes referred to as the medium access control (MAC) layer, offers logical channels to the layers above. The logical channels are distinguished by the different type of information they carry, and may include the Dedicated Control Channel (DCCH), Common Control Channel (CCCH), Dedicated Traffic Channel (DTCH), Common Traffic Channel (CTCH), Broadcast Control Channel (BCCH), the Paging Control Channel (PCCH) and others. The MAC layer may perform scheduling and mapping of logical channel data onto the transport channels provided by the physical layer. Also, for common transport channels, the MAC layer may add addressing information to distinguish data flows intended for different wireless terminals.

Finally, a lowest level, sometimes referred to as the physical layer, may control the transmission and reception of data over the radio frequency spectrum and may offer transport channels to the MAC layer. The transmission functions of the physical layer may include channel coding and interleaving, multiplexing of transport channels, mapping to physical channels, spreading, modulation and power amplification, with corresponding functions for reception.

Transport channels may be common i.e. shared by multiple wireless terminals at once, or dedicated to a single wireless terminal during a time period. Different types of transport channels have different characteristics of the transmission (e.g. FACH, RACH, DSCH, BCH, PCH, and others). Dedicated transport channels are assigned to only one handset at a time.

Each channel that a wireless terminal uses to communicate with a base station requires transmission power, and by the nature of many wireless terminal devices, the total transmission capability is limited. Thus, a major cause contributing to higher dropped connection rates for MRAB connections (e.g. simultaneous voice and data connections) vs. single RAB connections (e.g. voice only connection) is the faster exhaustion of the wireless terminal transmit power on the uplink connection. The reason for this is that in MRAB connections require additional uplink channels that the wireless terminal must transmit to maintain the connection. For example, in certain cellular telephone networks, the High Speed Dedicated Physical Control Channel (HS-DP-CCH) may carry the following types of control information from the wireless terminal to the base station: (1) Channel Quality Indicator (CQI), which is a number between 0 and 30; acknowledgments (ACK); and Negative Acknowledgments (NACK) for downlink transmission on High Speed Physical Downlink Shared Channel (HS-DPSCH). A wireless terminal needs a part of its available transmission power to HS-DPCCH. For example, a typical amount of power allocated to HS-DPCCH may range between 3 dB and 5 dB. This transmission power is taken away from the power that could have been assigned to uplink signaling radio bearer (SRB) and/or uplink voice radio bearer and/or uplink data radio bearer transmission capacity. This reduction in transmission capacity of uplink channels results in higher rates of dropped calls for cellular telephones while making MRAB calls. For example, a cellular phone use may be making a voice call while accessing a website (i.e. a MRAB call) and that user's transmission capacity of the voice channel is reduced by the need to allocate power to the HS-DPCCH.

When a wireless terminal is running out of transmission power during a MRAB connection, the primary concern is to keep the signaling radio bearer and voice radio bearers in good standing. Downlink data throughput on HS-DPSCH is of lower priority. Thus, one method to reduce dropped connections at the wireless terminal suspends sending of control information on the HS-DPCCH for MRAB calls when wireless terminal is in the limited transmission power condition. Given this broader concept, there are at multiple methods of suspending sending of control data on the HS-DPCCH. For example, control data can be completely suspended i.e. suspension of ACK, NACK and CQI on the HS-DPCCH. Alternatively, control data may be selectively suspended, such as suspending only CQI while ACK and NACK data are still sent on the HS-DPCCH.

Figure 3:
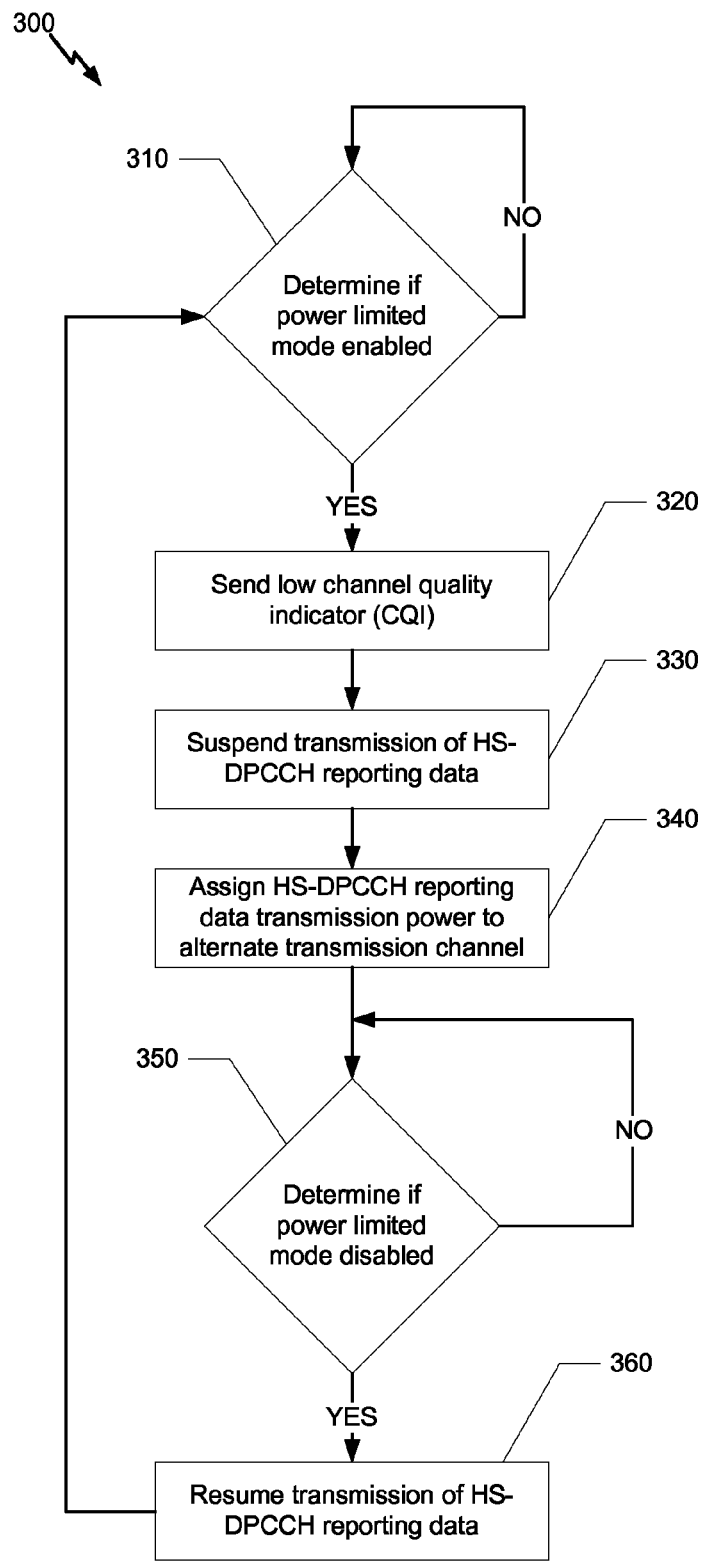
FIG. 3 is a flowchart illustrating an implementation of a method of wireless communication in the wireless terminal of FIG. 1.

FIG. 3 is a flowchart illustrating an implementation of a method 300 of wireless communication in the wireless terminal 100 of FIG. 1. Although the method 300 is described herein with reference to the wireless terminal 100 discussed above with respect to FIG. 1, a person having ordinary skill in the art will appreciate that the method 300 may be implemented by any other suitable device. In an embodiment, method 300 may be performed by the CPU 110 in conjunction with the transmitter 162, the receiver 164, and the memory 120. Although the method 300 is described herein with reference to a particular order, in various embodiments, blocks herein may be performed in a different order, or omitted, and additional blocks may be added.

The method 300 begins at decision block 310 where the wireless terminal 100 determines whether a power limited mode is enabled. A power limited mode may be enabled by a variety of conditions at the wireless terminal 100. For example, a power limited mode may be enabled as the wireless terminal 100 crosses a set threshold of transmit power. That is, a wireless terminal 100 capable of transmitting at a maximum power of, for example, 23 dB may enter a power limited mode once the current transmission power exceeds a threshold such as, for example, 20 dB. The power limited mode may trigger a variety of changes to the operating parameters of the wireless terminal 100, such as those described below. Alternatively, the power limited mode may be entered when the wireless terminal 100 selects one of the Transport Format Combinations from the minimum set of Transmit Format Combinations, as described in the 3GPP technical specifications, such as 25.321 and 25.133. Other implementations may have additional logic for enabling a power saving mode.

If, at decision block 310, the wireless terminal 100 determines that it is not in a power limited mode, then the method returns to decision block 310 and restarts. If, however, at decision block 310 the wireless terminal 100 determines it is in a power limited mode, then the method moves to block 320.

At block 320, the wireless terminal 100 sends a low channel quality index to the base station on the HS-DPCCH. The base station schedules downlink transmission on the HS-DPSCH based on the CQI sent by the wireless terminal 100 on the HS-DPCCH. The process then moves to block 330.

At block 330, the wireless terminal 100 suspends HS-DPCCH reporting data to the base station. In one embodiment, the wireless terminal 100 may completely suspend HS-DPCCH reporting data i.e. suspend ACK, NACK and CQI reporting data. In an alternative embodiment, the wireless terminal 100 may only suspend the CQI reporting data. Notably, in both embodiments, the CQI reporting data is suspended.

When the CQI transmission is suspended, the base station may assume that the CQI was sent by the wireless terminal 100 but was not received and/or decoded properly by the base station. Accordingly, the base station may continue to schedule downlink transmission to the wireless terminal 100 on the HS-DPSCH. The base station may continue to use the last reported value of CQI for scheduling downlink transmissions. Because of this, the wireless terminal 100 needs to make sure that the last CQI sent before suspending CQI transmission is not low (as is accomplished at block 320). The method then moves to block 340.

At block 340, the wireless terminal 100 assigns the HS-DPCCH transmission power (i.e. the power previously allocated to transmitting the HS-DPCCH reporting data) to an alternate channel, such as a voice or data channel. In doing so, the wireless terminal 100 may increase the reliability of those alternate channels by increasing their transmission power level. The method then moves to decision block 350

If at decision block 350 the wireless terminal 100 determines that the power limited mode is not disabled (i.e. enabled), then the method returns to decision block 350. If, however, at decision block 350 the wireless terminal 100 determines that the power limited mode is disabled, then it moves to block 360.

At block 360 the wireless terminal 100 resumes transmission of HS-DPCCH reporting data (e.g. CQI data). The process then returns to decision block 310 and restarts.

Figure 4:
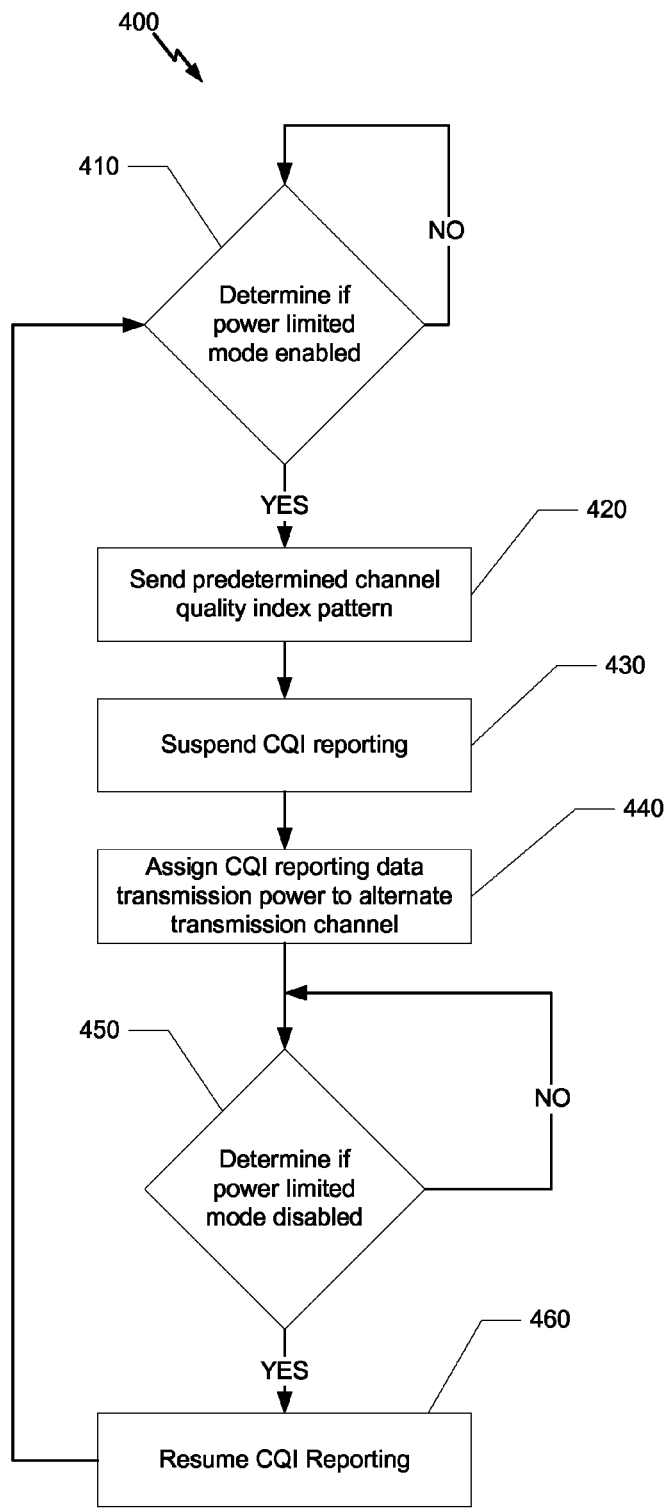
FIG. 4 is a flowchart illustrating an implementation of another method of wireless communication in the wireless terminal of FIG. 1.

FIG. 4 is a flowchart illustrating another implementation of a method 400 of transmission power control in the wireless terminal 100 of FIG. 1. Although the method 400 is described herein with reference to the wireless terminal 100 discussed above with respect to FIG. 1, a person having ordinary skill in the art will appreciate that the method 400 may be implemented by any other suitable device. In an embodiment, method 400 may be performed by the CPU 110 in conjunction with the transmitter 162, the receiver 164, and the memory 120. Although the method 400 is described herein with reference to a particular order, in various embodiments, blocks herein may be performed in a different order, or omitted, and additional blocks may be added.

The method 400 begins at decision block 410 where the wireless terminal 100 determines whether it is in a power limited mode.

If, at decision block 410, the wireless terminal 100 determines that it is not in a power limited mode, then the method returns to decision block 410 and restarts. If, however, at decision block 410, the wireless terminal 100 determines it is in a power limited mode, then the method moves to block 420.

At block 420, the wireless terminal 100 sends a predetermined sequence of CQI reports to the base station on the HS-DPCCH. For example, a CQI sequence of 0,30,0,30,0 may indicate that CQI suspension will follow. The base station recognizes this CQI sequence and stops scheduling downlink transmission on the HS-DPSCH. The process then moves to block 430.

At block 430, the wireless terminal 100 suspends CQI reporting to the base station. Alternatively, entire HS-DPCCH transmission is suspended. The method then moves to block 440.

At block 440, the wireless terminal 100 re-assigns the transmission power preciously assigned to HS-DPCCH to alternate transmission channels, such as, for example, the DPDCH and DPCCH channels. The method then moves to decision block 450.

If, at decision block 450, the wireless terminal 100 determines that the power limited mode is not disabled (i.e. enabled), then the method returns to decision block 450. If, however, at decision block 450 the wireless terminal 100 determines that the power limited mode is disabled, then it moves to block 460.

At block 460 the wireless terminal 100 resumes CQI reporting on the HS-DPCCH. Alternatively, entire HS-DPCCH transmission is resumed. The process then returns to decision block 410 and restarts.

Figure 5:
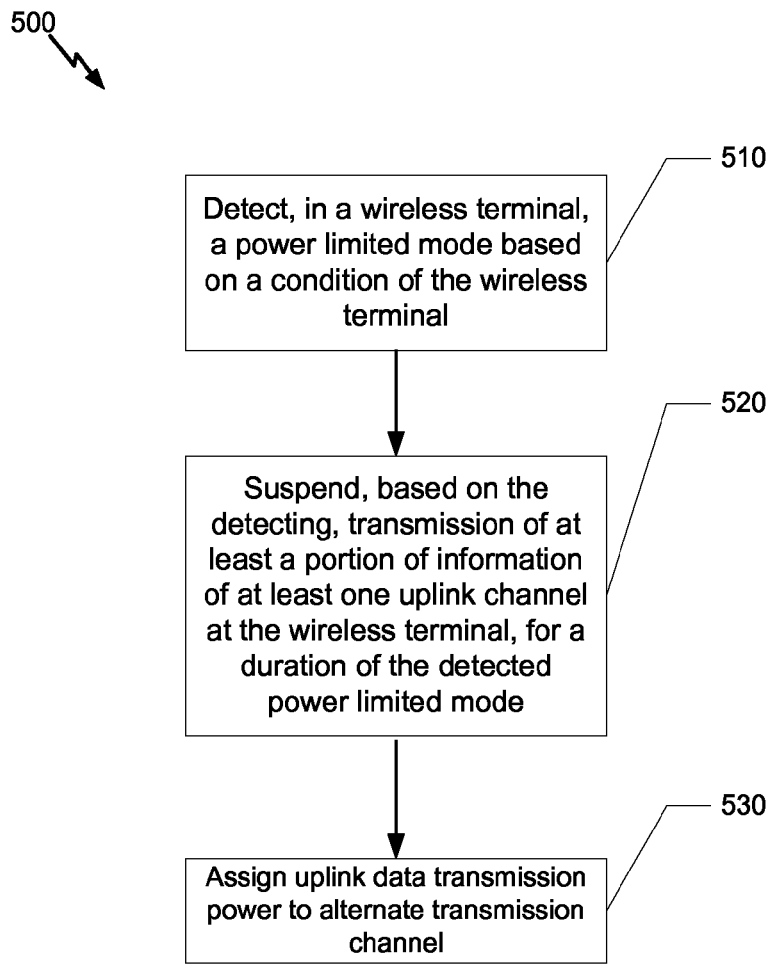
FIG. 5 is a flowchart illustrating an implementation of another method of wireless communication in the wireless terminal of FIG. 1.

FIG. 5 is a flowchart illustrating an implementation of another method 500 of wireless communication in the wireless terminal 100 of FIG. 1. Although the method 500 is described herein with reference to the wireless terminal 100 discussed above with respect to FIG. 1, a person having ordinary skill in the art will appreciate that the method 500 may be implemented by any other suitable device. In an embodiment, method 500 may be performed by the CPU 110 in conjunction with the transmitter 162, the receiver 164, and the memory 120. Although the method 500 is described herein with reference to a particular order, in various embodiments, blocks herein may be performed in a different order, or omitted, and additional blocks may be added.

The method starts at block 510 where the wireless terminal 100 detects the power limited mode based on a condition of the wireless terminal. The power limited mode may be enabled based on operating parameters of the wireless terminal 100 such as those described above with respect to FIG. 3.

The method then moves to block 520 where the wireless terminal 100 suspends transmission of transmission of at least a portion of information of at least one uplink channel at the wireless terminal 100. For example, the wireless terminal 100 can suspend uplink control information for HS-DPSCH, such as CQI reporting data, or all HS-DPCCH data. In an embodiment, the wireless terminal 100 can independently suspend portions of the uplink channel such as, for example, CQI, ACKs, and NACKs. The wireless terminal 100 can suspend transmission, based on the detected power limited mode, for a duration of the power limited mode.

In the illustrated embodiment, the method then moves to block 530 where the wireless terminal 100 reassigns the power previously assigned to the uplink data transmission to another data transmission channel, such as a voice channel or data channel. For example, a wireless terminal 100 may reassign to the Dedicated Physical Data Channel (DPDCH) and Dedicated Physical Control Channel (DPCCH) the power previously assigned to HS-DPCCH. The reassignment of power may increase the reliability of the alternate channels and reduce dropped connection rates. For example, a user of a cellular telephone may experience less dropped calls while using data and voice channels simultaneously if the method 500 is implemented by the user's cellular telephone. In another embodiment, block 530 may be omitted.

Figure 6:
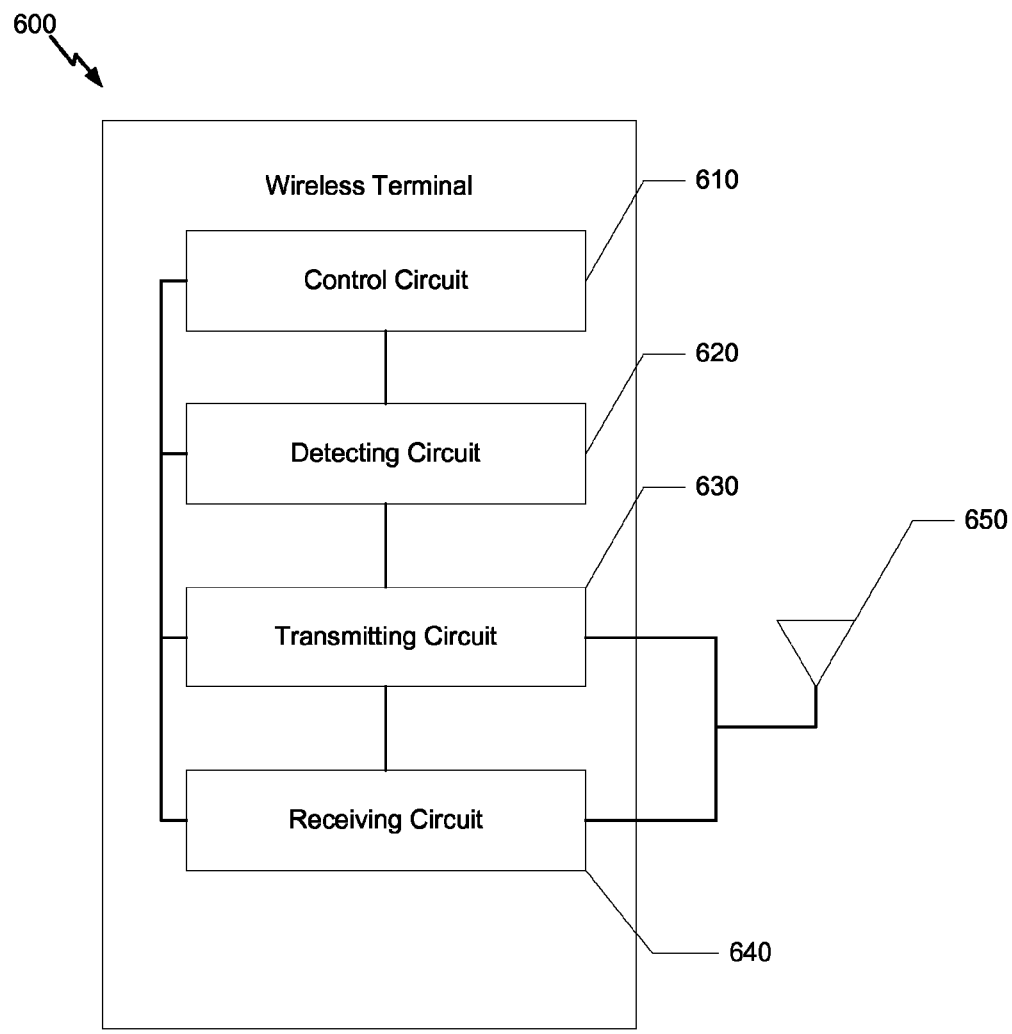
FIG. 6 is a block diagram of an example wireless terminal.

FIG. 6 is a block diagram of an example wireless terminal 600 in accordance with certain aspects of the present disclosure. Those skilled in the art will appreciate that a wireless terminal may have more or fewer components than the simplified wireless terminal 600 illustrated in FIG. 6. The wireless terminal 600 illustrates only those components useful for describing some prominent features of implementations within the scope of the claims.

The wireless terminal 600 includes a control circuit 610, a detecting circuit 620, a transmitting circuit 630, a receiving circuit 640 and an antenna 650. In one implementation the control circuit 610 is configured to perform one or more blocks as described in FIGS. 3-5 above. For example, the control circuit 610 can be configured to suspend transmission of uplink data on a first channel, such as the HS-DPCCH. In one implementation, the control circuit 610 includes means for suspending transmission of uplink data on a first channel includes a control circuit.

In one implementation the detecting circuit 620 is configured to detect a power limited mode based on a condition of the wireless terminal 600. In one implementation, the detecting circuit 620 can include means for detecting. In one implementation, the transmitting circuit 630 is configured to transmit data to a base station via the antenna 650. In one implementation, the transmitting circuit 630 can include means for transmitting. In one implementation, the receiving circuit 640 is configured to receive data from a base station via the antenna 650. In one implementation, the receiving circuit 640 can include means for receiving.

A wireless terminal may comprise, be implemented as, or known as user equipment, a subscriber station, a subscriber unit, a mobile station, a mobile phone, a mobile node, a remote station, a remote terminal, a user terminal, a user agent, a user device, or some other terminology. In some implementations a wireless terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

A base station may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), or some other similar terminology.

In some aspects a base station may comprise an access node for a communication system. Such an access node may provide, for example, connectivity for or to a network (e.g., a wide area network such as the Internet or a cellular network) via a wired or wireless communication link to the network. Accordingly, a base station may enable another node (e.g., a wireless terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless terminal or node may communicate via one or more wireless communication links that are based on or otherwise support any suitable wireless communication technology. For example, in some aspects a wireless terminal may associate with a network. In some aspects the network may comprise a local area network or a wide area network. A wireless terminal may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless terminal may support or otherwise use one or more of a variety of corresponding modulation or multiplexing schemes. A wireless terminal may thus include appropriate components (e.g., air interfaces) to establish and communicate via one or more wireless communication links using the above or other wireless communication technologies. For example, a wireless terminal may comprise a wireless transceiver with associated transmitter and receiver components that may include various components (e.g., signal generators and signal processors) that facilitate communication over a wireless medium.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), a wireless terminal, or a base station. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The above description is provided to enable any person skilled in the art to make or use embodiments within the scope of the appended claims. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication in a voice and data communication, comprising:
   establishing an uplink radio bearer channel prior to a power limited mode;
   detecting, in a wireless terminal, the power limited mode based on a condition of the wireless terminal being met, the condition being met when the wireless terminal transmits at a current transmission power that is less than a maximum transmission power of the wireless terminal by less than a threshold;
   suspending transmission of at least a portion of uplink control data on at least one uplink channel at the wireless terminal when the power limited mode is detected, for an entire duration of the detected power limited mode,
   wherein the uplink radio bearer channel is sustained during said suspending.

2. The method of claim 1, wherein the condition further comprises the wireless terminal having selected a transport format combination from a minimum set of transport format combinations.

3. The method of claim 1, further comprising assigning transmission power allocated for the transmission of the uplink control data on said at least one uplink channel to at least the uplink radio bearer channel after suspending transmission of the uplink control data on the at least one uplink channel.

4. The method of claim 3, wherein the at least one uplink channel comprises a High Speed Dedicated Physical Control Channel (HS-DPCCH).

5. The method of claim 3, wherein the uplink radio bearer channel comprises one of a Dedicated Physical Data Channel (DPDCH) and a Dedicated Physical Control Channel (DPCCH).

6. The method of claim 1, wherein said suspending comprises continuously suspending said transmission.

7. The method of claim 1, wherein said suspending comprises independently suspending one or more of a Channel Quality Indicator (CQI), an Acknowledgment (ACK), and a Negative Acknowledgment (NACK).

8. The method of claim 1, wherein the at least one uplink channel comprises a High Speed Dedicated Physical Control Channel (HS-DPCCH).

9. An apparatus for wireless communication in a voice and data communication, comprising:
   a receiver configured to receive data from a base station;
   a transmitter configured to transmit data, via an uplink radio bearer channel, to a base station prior to a power limited mode; and
   a processor configured to:
   detect the power limited mode based on a condition of the apparatus being met, the condition being met when the apparatus transmits at a current transmission power that is less than a maximum transmission power of the apparatus by less than a threshold; and
   suspend transmission of at least a portion of uplink control data on at least one uplink channel at the apparatus when the power limited mode is detected, for an entire duration of the detected power limited mode, while maintaining the uplink radio bearer transmission.

10. The method of claim 9, wherein the condition further comprises the apparatus having selected a transport format combination from a minimum set of transport format combinations.

11. The method of claim 9, wherein the processor is further configured to assign transmission power allocated for the transmission of the uplink control data on said at least one uplink channel to at least the uplink radio bearer channel after suspending transmission of the uplink control data on the at least one uplink channel.

12. The method of claim 11, wherein the at least one uplink channel comprises a High Speed Dedicated Physical Control Channel (HS-DPCCH).

13. The method of claim 11, wherein the uplink radio bearer channel comprises one of a Dedicated Physical Data Channel (DPDCH) and a Dedicated Physical Control Channel (DPCCH).

14. The method of claim 9, wherein the processor is configured to continuously suspend said transmission.

15. The method of claim 9, wherein the processor is configured to independently suspend one or more of a Channel Quality Indicator (CQI), an Acknowledgment (ACK), and a Negative Acknowledgment (NACK).

16. The method of claim 9, wherein the at least one uplink channel comprises a High Speed Dedicated Physical Control Channel (HS-DPCCH).

17. An apparatus for wireless communication in a voice and data communication, comprising:
   means for maintaining a voice or data link prior to a power limited mode;
   means for detecting the power limited mode based on a condition of the apparatus being met, the condition being met when the apparatus transmits at a current transmission power that is less than a maximum transmission power of the apparatus by less than a threshold; and
   means for suspending transmission of at least a portion of uplink control data on at least one uplink channel at the apparatus, for an entire duration of the detected power limited mode, without terminating the voice or data link.

18. The apparatus of claim 17, wherein the condition further comprises the apparatus having selected a transport format combination from a minimum set of transport format combinations.

19. The apparatus of claim 17, further comprising means for assigning transmission power allocated for the transmission of the uplink control data on said at least one uplink channel to at least the voice or data link after suspending transmission of the uplink control data on the at least one uplink channel.

20. The apparatus of claim 19, wherein the at least one uplink channel comprises a High Speed Dedicated Physical Control Channel (HS-DPCCH).

21. The apparatus of claim 19, wherein the voice or data link comprises one of a Dedicated Physical Data Channel (DPDCH) and a Dedicated Physical Control Channel (DPCCH).

22. The apparatus of claim 17, further comprising means for continuously suspending said transmission.

23. The apparatus of claim 17, further comprising means for independently suspending one or more of a Channel Quality Indicator (CQI), an Acknowledgment (ACK), and a Negative Acknowledgment (NACK).

24. The apparatus of claim 17, wherein the at least one uplink channel comprises a High Speed Dedicated Physical Control Channel (HS-DPCCH).

25. A computer program product for wirelessly communicating in a voice and data communication, comprising a non-transitory computer readable medium comprising instructions that when executed cause an apparatus to:
   maintain an uplink radio bearer channel prior to a power limited mode;
   detect the power limited mode based on a condition of the apparatus being met, the condition being met when the apparatus transmits at a current transmission power that is less than a maximum transmission power of the apparatus by less than a threshold; and
   suspend transmission of at least a portion of uplink control data on at least one uplink channel at the apparatus, for an entire duration of the detected power limited mode, while continuing the uplink radio bearer channel.

26. The computer program product of claim 25, wherein the condition further comprises the apparatus having selected a transport format combination from a minimum set of transport format combinations.

27. The computer program product of claim 25, wherein the medium further comprises instructions that when executed cause the apparatus to assign transmission power allocated for the transmission of the uplink control data on said at least one uplink channel to at least the uplink radio bearer channel after suspending transmission of the uplink control data on the at least one uplink channel.

28. The computer program product of claim 27, wherein the at least one uplink channel comprises a High Speed Dedicated Physical Control Channel (HS-DPCCH).

29. The computer program product of claim 27, wherein the uplink radio bearer channel comprises one of a Dedicated Physical Data Channel (DPDCH) and a Dedicated Physical Control Channel (DPCCH).

30. The computer program product of claim 25, wherein the medium further comprises instructions that when executed cause the apparatus to continuously suspend said transmission.

31. The computer program product of claim 25, wherein the medium further comprises instructions that when executed cause the apparatus to independently suspend one or more of a Channel Quality Indicator (CQI), an Acknowledgment (ACK), and a Negative Acknowledgment (NACK).

32. The computer program product of claim 25, wherein the at least one uplink channel comprises a High Speed Dedicated Physical Control Channel (HS-DPCCH).

33. The method of claim 1, further comprising resuming transmission of the suspended portion of the uplink control data in response to detecting termination of the duration of the power limited mode.

* * * * *